Aug. 11, 1953     W. H. SCHECHTER     2,648,596
SODIUM SUPEROXIDE PRODUCTION
Filed Aug. 5, 1950
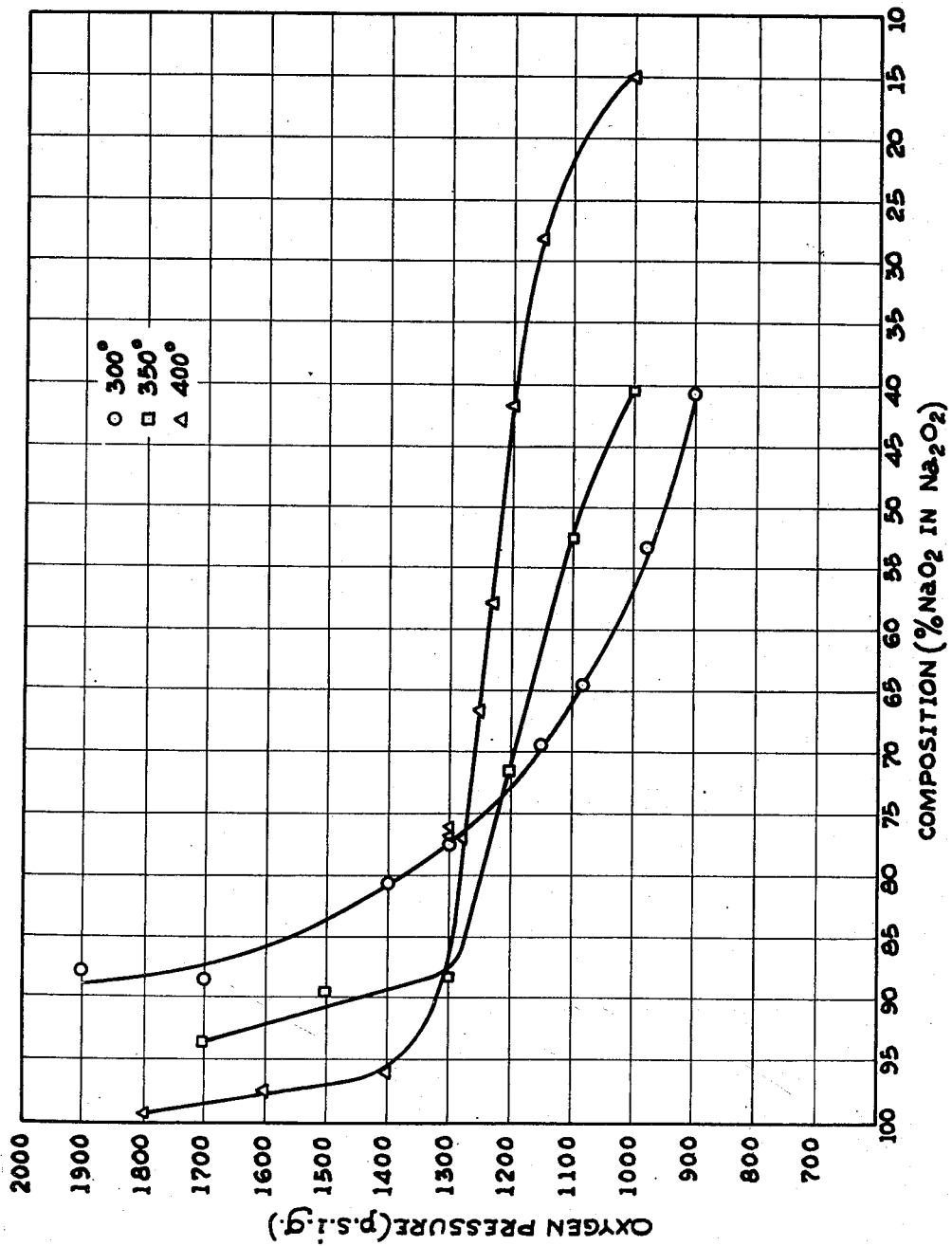
INVENTOR.
William H. Schechter.

Patented Aug. 11, 1953

2,648,596

UNITED STATES PATENT OFFICE 2,648,596

SODIUM SUPEROXIDE PRODUCTION

William H. Schechter, Zelienople, Pa.

Application August 5, 1950, Serial No. 177,977

10 Claims. (Cl. 23—184)

This invention relates to sodium superoxide, $NaO_2$.

The alkali metal oxides are useful for various purposes. For example, sodium peroxide ($Na_2O_2$) and potassium superoxide, or tetroxide ($K_2O_4$), release oxygen in contact with moisture. They have therefore been used extensively in breathing apparatus and for maintaining the atmosphere in closed spaces respirable, as in submarines or in other places where the atmosphere would otherwise become deficient in oxygen. Those oxides are particularly adapted to such purposes because when they are brought into contact with exhaled air the moisture contained in it reacts with the oxide to liberate an amount of oxygen equivalent to that consumed in respiration, and at the same time the oxide also fixes the exhaled carbon dioxide. For this reason these substances are especially adapted for use in breathing apparatus of the self-contained type.

Sodium peroxide has been used on a very large scale for such purposes. However, there is theoretically available from it at N. T. P. only about 145 cc. of oxygen per gram. Mixed oxides of sodium ($Na_2O_2$) and potassium ($K_2O_4$) have therefore been used to some extent because the form supplied commercially gave a greater yield of oxygen per unit weight than is available from $Na_2O_2$, namely, about 190 to 200 cc. per gram. More recently, substantially pure potassium tetroxide has been used for these purposes because there is theoretically available from it 236 cc. of oxygen per gram.

Obviously, it is advantageous and desirable to obtain from such materials as great a yield as possible of oxygen per unit weight. Thus, where space is important, the greater the yield per unit weight the more compact the device using it. Also, on the same basis a given amount of the oxygen-exchanging material will have longer effective life. Again, in a self-contained breathing apparatus the weight and compactness factors are of importance, to minimize fatigue of a worker using it, and accordingly the higher the oxygen-evolving power of such a substance the less the weight required in a canister designed to give a predetermined working-time.

Theoretically, sodium superoxide, $NaO_2$, would be better than sodium peroxide, potassium tetroxide, or their mixtures as used heretofore, because at 100 per cent purity it should liberate 305.6 cc. of oxygen per gram at N. T. P. However, oxides of sodium and potassium are produced by oxidation of the respective metals, commonly by burning the metal in contact with a stream of air or oxygen. Although in that way it is possible to prepare potassium superoxide, or tetroxide, the literature on the subject shows that, curiously enough, the corresponding oxide of sodium, i. e., $NaO_2$, has never been prepared by combustion or metallic sodium in air or oxygen, or by air or oxygen oxidation of sodium peroxide ($Na_2O_2$), which is the highest oxide of sodium that has been prepared heretofore by combustion of sodium in an oxygen-containing atmosphere. Consequently, this desirable sodium superoxide has not been available as a substitute for the foregoing oxygen-evolving compositions.

A primary object of this invention is to provide sodium superoxide.

Another object is to provide a method of producing sodium superoxide in admixture with lower oxide of sodium that is simple, easily performed, and adapted to provide products containing desired content of available oxygen.

Yet another object is to provide a simple and effective method of making substantially pure $NaO_2$.

I have discovered, and it is upon this that my invention is in large part predicated, that if instead of following prior practices of producing the alkali metal oxides by combustion in an oxygen-containing atmosphere at normal pressure, or at pressures near atmospheric, metallic sodium or sodium peroxide be heated in a bomb, i. e., a closed pressure container, to an elevated temperature in contact with oxygen under pressure substantially above atmospheric, the superoxide is formed. If, however, the temperature be raised while subjecting the sodium peroxide to high oxygen pressure, the peroxide is progressively converted to the superoxide by continued exposure at a given temperature and pressure, or by increase in oxygen pressure at given temperature and time of exposure. Under proper conditions substantially pure sodium superoxide can be produced in this way. Or, if the pure superoxide is not needed, mixtures of $Na_2O_2$-$NaO_2$ having greater contents of available oxygen than $Na_2O_2$, $KO_2$ or mixtures of them may be produced by the method of the invention.

The content of sodium superoxide in products made by my method may be determined readily by treating a weighed sample with a solution that is 2M with respect to HCl and 1M in ferric chloride. From the corrected volume of $O_2$ evolved per gram of product the weight per cent of $NaO_2$ is then calculated by the formula $$\frac{cc.\ O_2/gm. - 144}{162} \times 100 = \%\,NaO_2$$

The numerator represents the cc. of $O_2$ per gram beyond that required for pure $Na_2O_2$, and the denominator the difference in cc. of $O_2$ evolved per gram between pure $NaO_2$ and $Na_2O_2$.

The factors described above have been demonstrated by numerous tests and they are illustrated by the following data of runs made in a high pressure bomb of about 180 ml. capacity:

| Starting Material | Press., p. s. i. | Temp., °C. | Time, Hrs. | Product | |
|---|---|---|---|---|---|
| | | | | cc. $O_2$/gm. | Percent $NaO_2$ |
| $Na_2O_2$ | 1,500 | 450 | 12 | 277 | 82.5 |
| $Na_2O_2$ | 2,000 | 450 | 12 | 281 | 84.5 |
| $Na_2O_2$ | 2,000 | 500 | 2 | 263 | 73.5 |
| $Na_2O_2$ | 2,000 | 500 | 4.75 | 289 | 89.5 |

I have found also that the reaction can be accelerated by mixing the $Na_2O_2$ with a wide variety of metallic oxides that act to catalyze the reaction. Thus at 2000 p. s. i. oxygen pressure, 500° C., and two hours exposure in the small bomb conversions of $Na_2O_2$ to 70 per cent $NaO_2$ were obtained with $MoO_3$, $V_2O_5$, CdO, $Fe_2O_3$, $Cr_2O_3$, $Ni_2O_3$, MgO, $Co_2O_3$, CuO, $TiO_2$. Of these, CdO and $TiO_2$ have given optimum results. Thus, with 1.2 per cent by weight of CdO 88 per cent of $NaO_2$ was produced from $Na_2O_2$ at 2000 p. s. i. $O_2$ and 500° C. after four hours. About 0.6 per cent of CdO has been found to exert the optimum effect. The effect of $TiO_2$ (0.68 per cent by weight of the $Na_2O_2$) is shown by the following data:

| Catalyst | Press., p. s. i. | Temp., °C. | Time, Hrs. | Product | |
|---|---|---|---|---|---|
| | | | | cc. $O_2$/gm. | Percent $NaO_2$ |
| None | 2,000 | 500 | 4 | 266 | 75.5 |
| $TiO_2$ | 2,000 | 500 | 4 | 289 | 89.5 |

Runs made in a larger bomb, or autoclave, have shown that higher percentages of sodium superoxide, and even essentially pure $NaO_2$ can be obtained at lower temperatures than in the small bomb. This is due, I believe, in part to reduced corrosion of the bomb material, or liner material, and in part to the fact that my work shows the reaction $Na_2O_2 \rightarrow NaO_2$ to be exothermic. The latter factor acts in larger masses of $Na_2O_2$ by causing local higher temperature than in the case of small bodies where heat losses are greater.

The accompanying drawing is a series of graphs representing temperature-pressure-composition relationships in the conversion of $Na_2O_2$ to $NaO_2$ after 4 to 6 hours, in accordance with the invention. The data were obtained with a bomb made from Type 347 stainless steel, of 4.6 liter capacity and holding charges of $Na_2O_2$ of 3 to 3.5 lbs. Heat was supplied by electric strip heaters. The bomb was provided with a nickel liner made by welding a nickel disc to the bottom of a nickel tube. This is necessitated by the fact that at the temperatures involved sodium peroxide attacks stainless steel. "Pyrex" glass liners may be used up to about 450° C. for short periods, but for most purposes nickel liners are best.

Experience has shown that in the practice of this method sodium peroxide that is dense or in the form of hard granules yields products of lower available oxygen content than where the peroxide is finely divided and presents larger surface area. The best conversions have been obtained with sodium peroxide made by atomization of molten metallic sodium in accordance with U. S. Patent No. 2,405,580 to C. B. Jackson. This peroxide is of very low bulk density and possesses very high exposed surface area; it was used in the runs represented in the drawing.

The graphs show how conversion of $Na_2O_2$ to $NaO_2$ can be controlled in 4 to 6 hour runs according to variation in temperature and pressure. Thus, 90 per cent conversion is to be had at 1450 p. s. i. $O_2$ pressure at 350° C., or by heating at 400° C. under about 1310 p. s. i. $O_2$ pressure. Likewise, substantially pure $NaO_2$ (more than 99% purity) is produced at 1800 p. s. i. and 400° C. Where lower contents of $NaO_2$ in $Na_2O_2$ suffice for particular purposes they may be had at lower pressures and temperatures, as appears from the graphs.

As further showing how the pressure may be lowered through increase in pressure, at 450° C. an oxygen pressure of 1700 p. s. i. sufficed to produce 97 per cent $NaO_2$ in 4 to 6 hours.

Tests have shown high purity sodium superoxide made in this way to be satisfactorily stable at 65° C. (150° F.) so that its stability at the maximum temperatures to which it would normally be exposed, even in the tropics, is assured. It tends to lose oxygen very slowly at 100° C., however.

$NaO_2$, or mixtures with $Na_2O_2$, made at 450° C. is generally fused solid. It may be granulated or ground to prepare it for use. Operation at 400° C. causes some shrinkage of the original charge after 5 hours, and substantial shrinkage after 24 hours. At 350° C. and lower there is no appreciable shrinkage during the conversion. Thus the bulk density of the product can be controlled by the temperature and the duration of the run. It is affected also by the pressure.

Lower temperatures than those given above by way of exemplification may be used but require longer times and higher pressures, and the conversion is generally less. Thus, at 200° C. and 3275 p. s. i. oxygen pressure 11 per cent of $NaO_2$ is obtained after 100 hours.

Similarly, metallic sodium can be converted to $NaO_2$ by treatment, at high temperatures and high oxygen pressures. For instance, at 180 Atm. abs. $O_2$ pressure and 300° C. metallic Na gave a product that evolved $O_2$ equivalent to 70 per cent conversion to $NaO_2$. Test has shown that $NaO_2$ can be produced by my method also from $Na_2O$. Of course mixtures of Na and $Na_2O$ or $Na_2O_2$ or both oxides, may be treated similarly.

The desirability of this substance as a substitute for the sodium and potassium oxides that have been used heretofore as oxygen-evolving substances is evidenced by the fact that a mixture of the peroxide and superoxide obtained in this way and containing 93 per cent of the superoxide liberates 292 cc. of oxygen (N. T. P.) per gram, while at 99 per cent purity it evolves 303 cc. per gram.

Evidence that this product is indeed a superoxide has been obtained by magnetic susceptibility determinations. Extrapolation of a plot of the gram susceptibility in c. g. s. units found for various mixtures of sodium peroxide and superoxide gave a value for pure superoxide corresponding to an effective magnetic moment of 2.07 Bohr magnetrons, which is in excellent agreement with the moments of other superoxides reported in the literature.

The process provided by this invention may be performed simply and readily in high pressure apparatus with which the art is familiar and which therefore needs no detailed description.

This application is a continuation-in-part of my copending application Serial No. 79,905, filed March 5, 1949, now abandoned.

According to the provisions of the patent statutes, I have explained the principle and mode of practicing my invention and have illustrated and described what I now consider to represent its best embodiment. However, I desire to have it understood that, within the scope of the appended claims, the invention may be practiced otherwise than as specifically illustrated and described.

I claim:

1. In a method of making sodium superoxide ($NaO_2$) the steps comprising heating at least one material of the group metallic sodium, sodium monoxide, and sodium peroxide in a closed container to a temperature of at least about 200° C. while supplying oxygen under a pressure of at least about 1500 p. s. i. and thereby producing said superoxide from said material, and recovering the oxidized product thus formed.

2. In a method of making sodium superoxide ($NaO_2$) the steps comprising heating metallic sodium in a closed container to a temperature of at least about 200° C. while supplying oxygen under a pressure of at least about 2700 p. s. i. and thereby producing said superoxide from said material, and recovering the oxidized product thus formed.

3. In a method of making sodium superoxide ($NaO_2$) the steps comprising heating sodium peroxide in a closed container to a temperature between about 300° C. and 500° C. while supplying oxygen under a pressure between about 1500 and 2000 p. s. i. and thereby producing said superoxide from said peroxide, and recovering the oxidized product thus formed.

4. In a method of making sodium superoxide ($NaO_2$) the steps comprising heating sodium peroxide in a closed container to a temperature between about 450° C. and 500° C. while supplying oxygen under a pressure between about 1500 and 2000 p. s. i. and thereby producing said superoxide from said peroxide, and recovering the oxidized product thus formed.

5. That method of making sodium superoxide ($NaO_2$) which comprises heating sodium peroxide in a closed container to a temperature of at least about 300° C. while supplying oxygen under a pressure of at least about 1700 p. s. i. for a time to produce equilibrium condition and thereby producing said superoxide from said peroxide, and recovering the oxidized product thus formed.

6. In a method of making sodium superoxide ($NaO_2$) the steps comprising heating sodium peroxide and as a catalyst a minor amount of oxide of a metal having an atomic weight greater than that of sodium in a closed container to a temperature of at least about 200° C. while supplying oxygen under a pressure of at least about 1500 p. s. i. and thereby producing said superoxide from said peroxide, and recovering the oxidized product thus formed.

7. In a method of making sodium superoxide ($NaO_2$) the steps comprising heating sodium peroxide and a minor amount of cadmium oxide in a closed container to a temperature of about 450° C. to 500° C. while supplying oxygen under a pressure of at least about 1750 p. s. i. and thereby producing said superoxide from said peroxide, and recovering the oxidized product thus formed.

8. In a method of making sodium superoxide ($NaO_2$) the steps comprising heating sodium peroxide and a minor amount of titanium dioxide in a closed container to a temperature of about 500° C. while supplying oxygen under a pressure of about 2000 p. s. i. and thereby producing said superoxide from said peroxide, and recovering the oxidized product thus formed.

9. The method of producing sodium superoxide, $NaO_2$, which comprises heating sodium peroxide in a closed container to a temperature of at least about 200° C. in an atmosphere of oxygen supplied under a pressure of at least about 200 atmospheres and recovering the superoxide formed.

10. That method of producing sodium superoxide, $NaO_2$, which comprises heating sodium peroxide in a closed container to a temperature of about 400° C. in an atmosphere of oxygen under a pressure of at least about 1310 pounds per square inch, and recovering the superoxide formed.

WILLIAM H. SCHECHTER.

References Cited in the file of this patent

UNITED STATES PATENTS

| Number | Name | Date |
|---|---|---|
| 2,405,580 | Jackson | Aug. 13, 1946 |
| 2,414,116 | Miller | Jan. 14, 1947 |

FOREIGN PATENTS

| Number | Country | Date |
|---|---|---|
| 8,503 | Great Britain | Nov. 23, 1911 |

OTHER REFERENCES

J. W. Mellor's "A Comprehensive Treatise on Inorganic and Theoretical Chem.," vol. 2, page 493, Longmans, Green and Co., N. Y.

"Chem. Abstracts," vol. 42, No. 8, pages 2533 (1948), published by ACS.